United States Patent [19]

Bouchard et al.

[11] 4,063,341

[45] Dec. 20, 1977

[54] PROCESS FOR MAKING MULTILAYER CAPACITORS

[75] Inventors: Robert Joseph Bouchard, Wilmington, Del.; Lothar Heinrich Brixner, West Chester, Pa.; Michael John Popowich, Lewiston, N.Y.

[73] Assignee: E. I. Du Pont de Nemours and Company, Wilmington, Del.

[21] Appl. No.: 688,932

[22] Filed: May 21, 1976

Related U.S. Application Data

[62] Division of Ser. No. 594,281, July 9, 1975, abandoned.

[51] Int. Cl.² .............................................. H01G 4/10
[52] U.S. Cl. .................................. 29/25.42; 252/63.5; 361/313
[58] Field of Search ............... 29/25.42; 317/258, 261; 252/63.5; 264/61

[56] References Cited

U.S. PATENT DOCUMENTS

| | | | |
|---|---|---|---|
| Re. 26,421 | 7/1968 | Rodriguez et al. | 29/25.42 |
| 3,472,777 | 10/1969 | Brixner | 252/62.9 |
| 3,536,625 | 10/1970 | Murakawa et al. | 252/62.9 |
| 3,604,082 | 9/1971 | McBrayer et al. | 29/25.42 |

FOREIGN PATENT DOCUMENTS 2,449,698  4/1975  Germany.

*Primary Examiner*—Carl E. Hall

[57] ABSTRACT

Multilayer capacitors of good electrical properties can be made by firing, in air at low temperatures, certain modified lead titanate dielectric compositions. The dielectric compositions have the formula $$(Sr_xPb_{1-x}TiO_3)_a(PbMg_{0.5}W_{0.5}O_3)_b$$

wherein
  $x$ is 0–0.10,
  $a$ is 0.35–0.5,
  $b$ is 0.5–0.65, and
  $a$ plus $b$ equals 1.

4 Claims, 1 Drawing Figure

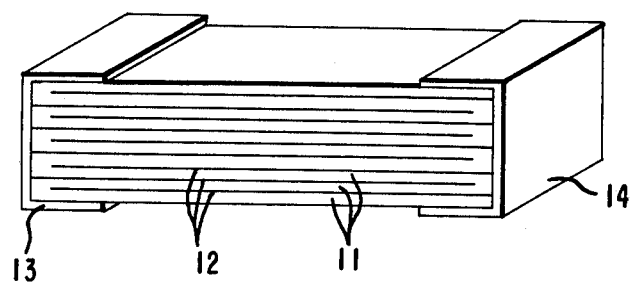

PROCESS FOR MAKING MULTILAYER CAPACITORS

This is a division of application Ser. No. 594,281, filed July 9, 1975, now abandoned.

BACKGROUND OF THE INVENTION

This invention relates to electrical capacitors, and more particularly to monolithic capacitors made by lamination and firing of electroded dielectric layers.

Multilayer monolithic capacitors comprise a multiple number of dielectric layers, at least some of which bear metallizations (electrodes) in desired patterns. Such capacitors are made from green (unfired) tape of ceramic particles held together with an organic binder, by cutting pieces of tape from a sheet of tape, metallizing some of the tape pieces, stacking and laminating the pieces of tape, and firing the resultant laminate to drive off organic binders and any solvents and form a sintered (coherent) body, which is termed monolithic. Rodrieguez et al. U.S. Pat. No. 3,456,313 discloses a process for making them. FIG. 1 of Fabricius U.S. Pat. No. 3,223,905 shows a multilayer capacitor, which may be of alternating palladium and barium titanate layers.

Metallizations useful in producing conductors for multilayer capacitors normally comprise finely divided metal particles, applied to dielectric substrates in the form of a dispersion of such particles in an inert liquid vehicle.

Monolithic multilayer capacitors are typically manufactured by co-firing barium titanate formulations and conductive electrode materials in oxidizing atmospheres at temperatures of 1200°–1400° C. This process yields durable, well-sintered capacitors with high dielectric constant, e.g., greater than 1000. However, firing under these conditions requires an electrode material with high melting point, good oxidation resistance at elevated temperatures, sinterability at the maturing temperature of the dielectric, and minimal tendency to interact with the dielectric at the sintering temperature. These requirements normally limit the choice of electrode materials to the noble metals platinum and palladium, or to alloys of platinum, palladium, and gold.

Significant savings in electrode costs could be realized if dielectirc materials could be modified to (1) yield good dielectric properties (high dielectric constant and low dissipation factor) after firing in reducing atmospheres, so that base metals could be used as electrodes, and/or (2) sinter at temperatures of 950° C. or lower so that silver, which is significantly less costly than the other noble metals but has a lower melting point (962° C.), could be used in electrode formation.

Attempts have been made to modify barium titanate ceramics so that they may be fired in reducing (e.g., hydrogen) or inert (e.g., argon, nitrogen) atmospheres. The use of this approach has been somewhat limited in that the electrical properties, e.g., dielectric constant, dissipation factor, temperature coefficient of capacitance, etc., are compromised as compared with those of conventional air-fired compositions. In addition, maintaining an inert or reducing atmosphere involves an additional production cost as compared to firing in air. Exemplary of this approach is Buehler U.S. Pat. No. 3,757,177, disclosing capacitors of base metal electrodes (e.g., Ni, Co, Fe) and modified barium titanate ($MnO_2$, $Fe_2O_3$, $CeO_2$, $CaZrO_3$) fired in an inert atmosphere at about 1300° C. (col. 3, lines 33–34). Even with these high firing temperatures and the expense of firing in an inert atmosphere, the highest dielectric constant reported there is 1800 (col. 3, line 67).

Several attempts have been made to reduce the maturing temperature of dielectrics by mixing high temperature ferroelectric phases (titanates, zirconates, etc.) with glasses which mature at relatively low temperatures. Examples of this approach are given in Maher U.S. Pat. No. 3,619,220; Burn U.S. Pat. No. 3,638,084; Maher U.S. Pat. No. 3,682,766; and Maher U.S. Pat. No. 3,811,937. The drawback of this technique is that the dilution effect of the glass often causes the dielectric constant of the mixture to be relatively low, in the 25–200 range.

Another technique for lowering the sintering temperature of titanate-based dielectrics is by the use of "sintering aids." Additions of bismuth oxide or bentonite to barium titanate lowers the maturing temperature to about 1200° C. (Nelson et al. U.S. Pat. No. 2,908,579). Maturing temperatures of 1200°–1290° C. may be attained by addition of phosphates to titanates as described in Thurnauer et al. U.S. Pat. No. 2,626,220. However, in each of these cases, the decrease in maturing temperature is not sufficient to permit the use of co-fired silver electrodes and dielectric properties are often degraded.

There exists a need for a composition which can produce a high dielectric constant (e.g., 1000 or above) and low dissipation factor (e.g., less than 5%, preferably less than 3%) and sinters in air at low temperatures (e.g., less than 1000° C. or less). This would permit co-firing with silver or palladium/silver electrodes and hence would greatly reduce the cost of high dielectric constant multilayer capacitors.

N. N. Krainik et al. (Soviet Physics-Solid State, 2, 63–65, 1960), report solid solutions between, inter alia, $PbTiO_3$, and $PbMg_{0.5}W_{0.5}O_3$. Apparently a wide range of compositions, with 0–80% $PbTiO_3$, was investigated (see FIG. 2). Firing was carried out in an atmosphere of PbO vapor, which precludes practical commerical applicability. No suggestion was made as to the manufacture of multilayer capacitors. In a second article from the same laboratory, G. A. Smolenskii et al. (Soviet Physics-Solid State 3, 714, 1961) report investigating certain solid solutions, including those of Krainik et al. Firing was similarly done in PbO. Phase transitions are discussed. In what is apparently a third article in this series, A. I. Zaslavskii et al. (Soviet Physics-Crystallography 7, 577, 1963), X-ray structural studies are reported.

Brixner U.S. Pat. No. 3,472,777 discloses the manufacture of ferroelectric ceramic discs by a two step firing process. Each firing step is taught to occur in the range 800°–1200° C., in air. In the sole example firing was at 1050° C. Brixner discloses various dielectric compositions such as $PbMg_{1/3}Ti_{1/3}W_{1/3}O_3$, $Pb_{0.8-0.9}Sr_{0.1-0.2}Mg_{1/3}Ti_{1/3}W_{1/3}O_3$ and Y-containing compositions.

Incorporated by reference herein is Sheard U.S. Pat. No. 3,872,360, issued Mar. 18, 1975, relevant to the preparation of monolithic multilayer capacitors.

SUMMARY OF THE INVENTION

This invention is a monolithic capacitor fired in air at 1050° C. or less, having a dielectric constant of at least 1000 and a dissipation factor of less than 5%, comprising a plurality of superimposed alternating layers of a dielectric composition and metal electrodes bonded together into a unitary body, the dielectric composition having the formula $$(Sr_xPb_{1-x}TiO_3)_a(PbMg_{0.5}W_{0.5}O_3)_b$$

wherein
 $x$ is 0–0.10,
 $a$ is 0.35–0.5,
 $b$ is 0.5–0.65, and
 $a$ plus $b$ equals 1.

Preferred capacitors are those where, in the dielectric composition, $a$ is 0.35–0.45 and $b$ is 0.55–0.65.

In one preferred embodiment, there is no strontium in the dielectric composition, that is $x$ is 0. In other preferred embodiments, strontium is present such that in the dielectric composition $x$ is 0.01–0.08. Preferred capacitors are those having silver electrodes or Pd/Ag electrodes. Preferably, for reasons of economy, the Pd/Ag electrodes comprise no more than 20% Pd, based on the total weight of Pd and Ag.

Another embodiment of the invention is a method of making such monolithic capacitors comprising a plurality of superimposed alternating layers of a dielectric composition and metal electrodes bonded together into a unitary body, the method comprising the steps of
 a. calcining in air, at a peak temperature in the range 750°–900° C., for at least 5 minutes, preferably for at least 15 minutes, and usually for 0.5–8 hours, a mixture of oxides or precursors thereof in such relative proportions to produce the desired dielectric composition described above, then comminuting the resultant calcined product to the desired fineness (usually substantially all the particles are 20 microns or less in largest dimension),
 b. preparing an unsintered flexible ceramic dielectric tape of the calcined product of step (a) in an inert liquid vehicle therefor,
 c. electroding two or more such tapes in the desired pattern with a dispersion of metal powder in an inert vehicle therefor,
 d. laminating a multiple number of such tapes as desired, the top layer being an unelectroded tape, and
 e. sintering the resultant laminate in air for at least 0.25 hour, preferably at least 0.5 hour, at a temperature in the range 900°–1050° C. to form a unitary monolithic multilayer capacitor having a K of at least 1000 and a dissipation factor of no more than 5%.

Where the metal powder of step (c) is silver powder, the sintering temperature of step (e) is preferably in the range 900°–950° C. Where the metal powder of step (c) is Pd/Ag, the sintering temperature of step (e) is normally in the range 900°–1050° C. A preferred method is that wherein the calcining step (a) is conducted for 0.25–8 hours and the sintering of step (e) is conducted at 900°–1050° C. for 0.5–4 hours.

BRIEF DESCRIPTION OF THE DRAWING

In the single FIGURE of the drawing, which shows on an enlarged scale a monolithic capacitor, 11 indicates layers of dielectric material, 12 indicates buried electrode layers and 13 and 14 indicate terminal electrodes which join electrically alternating internal electrodes along opposed edges of the capacitors. Through these terminal electrodes the capacitors are connected into the desired electrical circuit.

DETAILED DESCRIPTION

The essential feature of the present invention is the use of the dielectric compositions described herein in the manufacture of multilayer monolithic capacitors. The use of this composition permits the formation of capacitors of excellent characteristics, although fired at low temperatures in air.

The dielectric of the present invention has the final composition set forth above. That final compositon may also be expressed as follows:

$$Sr_{0-0.10}Pb_{0.90-1.0}Ti_{0.35-0.50}Mg_{0.25-0.325}W_{0.25-0.325}O_3,$$

the total of (Sr and Pb) being 1.0 and the total of (Ti and Mg and W) being 1.0. It is well known that in dielectric materials of the perovskite structure the amount of oxygen may vary from the stoichiometric amount. These dielectric compositions may be prepared from the oxides of strontium, lead, titanium, magnesium, and tungsten, or from precursors thereof such as carbonates, hydroxides, nitrates, etc. Lead, magnesium, and strontium are conveniently supplied as carbonates, whereas titanium and tungsten are conveniently supplied as oxides. Lead oxide (PbO) also is a convenient source of lead and strontium nitrate is a convenient source of strontium. Mixtures of oxides and precursors thereof may, of course, be employed.

The oxides or precursors are mixed together using conventional techniques (e.g., ball milling mortar and pestle, etc.) and then calcined in air (or an oxygen atmosphere) at a temperature not in excess of about 900° C. Calcining normally occurs at a temperature in the range 750°–900° C. for at least 5 minutes, preferably at least 15 minutes, and usually for 0.5–8 hours. The preferred duration of calcining will be dependent upon the particular starting materials employed, e.g., lead oxide versus lead carbonate, etc.; the proportions of starting materials; the calcining temperatures; etc. As is well known, with lower temperatures longer duration of calcining will usually be employed. Calcining for more than 8 hours does not appear to cause any significant property improvements in the capacitors of this invention. Therefore, calcining may be conducted for longer than 8 hours yet still be within the purview of this invention.

Following the calcining step, the calcined product may then be milled to the desired fineness. Normally, the calcined product is reduced in size so that substantially all the particles are 20 microns or less in largest die dimension. Usually the dielectric powders employed in preferred embodiments will have surface areas in the range 0.2–5 m.$^2$/g.

The calcined product is then dispersed in an inert liquid vehicle and cast using conventional techniques as a tape on a flat surface. The vehicle may be any of those conventionally used to form tapes, normally comprising polymeric components and organic liquids, such as that disclosed in U.S. Pat. No. 3,757,177, that is, an organic binder of acryloid plastic dispersed in ethylene dichloride, the binder often comprising about 45% of the total weight of the sheet. Individual dielectric pieces are punched out of the tape.

The green (unsintered) dielectric tape is then electroded with a dispersion of a metal in a temporary vehicle therefor, the electroding being in the desired configuration. Such vehicles may be any of those commonly used in the art, including those disclosed in Sheard U.S. Pat. No. 3,872,360, which is incorporated by reference herein. In the present invention the preferred metal powder is silver or palladium/silver, there normally being no more than 20% palladium based upon the total weight of palladium and silver.

After printing the electrode material on the green ceramic, the resulting electroded pieces are either then dry or wet stacked to the appropriate number of layers, pressed (up to 5000 psig with or without heat), optionally diced and then fired.

A typical firing cycle for multilayer capacitors comprises two phases. The first, called bisquing normally reaches a peak temperature not in excess of 500° C. The duration of this phase depends to some extent on the number of layers in the laminate. The purpose is the non-catastropic removal of vehicle (solvent and binder) both in the electrodes and in the green dielectric sheets. After this is accomplished, a rapid (several hours or less) heat up to the desired peak or soaking temperature normally occurs, for the purpose of maturing or sintering the ceramic dielectric.

In the present invention a principal advantage is the ability of the dielectric to be sintered in air at temperatures below 1050° C. versus 1400° C. currently used. The actual sintering temperature employed depends upon the specific composition employed, the electrode composition employed, and the properties desired of the final capacitor. Sintering is conducted at a temperature in the range 900°–1050° C., for a period not less than 0.25 hour (preferably at least 0.5 hour), nor more than 4 hours.

In the following examples and elsewhere in the specification and claims, all parts, percentages, and ratios are by weight unless otherwise stated.

EXAMPLES 1-6

Three precalcined dielectric compositions were prepared as follows from the materials indicated in Table I.

TABLE I

| Dielectric Composition | Components (wt. in g.) | | | | Fired Composition |
| --- | --- | --- | --- | --- | --- |
| | $PbCO_3$ | $MgCO_3$ | $TiO_2$ | $WO_3$ | |
| A | 278.609 | 31.8393 | 21.1591 | 78.5688 | $PbMg_{0.325}Ti_{0.350}W_{0.325}O_3$ |
| B | 280.667 | 29.7398 | 23.5708 | 73.0606 | $PbMg_{0.300}Ti_{0.400}W_{0.300}O_3$ |
| C | 282.751 | 27.4639 | 38.0476 | 67.4696 | $PbMg_{0.275}Ti_{0.450}W_{0.275}O_3$ |

The indicated starting materials for dielectric (reagent grade) were mixed together in a ball mill with 350 cc. water for about 1 hour (total solids weight about 400 g. of starting material). The milled samples were then calcined in air in mullite at 875° C. for 2 hours (raised from room temperature to 875° C. over 3 hours and held), and then crushed to minus 48 mesh and finally milled in a ball mill as before for 0.5 hour. The final particle size was such that substantially all the particles were less than 20 microns in largest dimension.

Flexible tapes were prepared by mixing 100 g. dielectric powder with 125 g. of a vehicle to form a slurry. The tape vehicle was acryloid-based and comprised 40.3% acryloid B7 (Rohm and Haas), 2.8% santicizer 160 (Central Solvent Co.), 0.2% of a rosin solution (10% rosin in isopropyl alcohol), 0.3% of a glycerine solution (10% glycerine in isopropyl alcohol) and 56.4% trichloroethylene. The slurry was doctor-bladed on a flat plate using conventional techniques. The tape was dried at room temperature overnight to form green flexible tape about 1.5 mils (38 microns) thick. Then the tape was cut into 0.5 inch (1.3 cm.) diameter discs, and electroded as desired with the electrode composition indicated below. Electrodes were printed through a 325-mesh screen (U.S. scale), the resultant dried print being about 0.6 mil (15 microns) thick.

Electroded discs were notched to provide for subsequent electrical contact. Two electroded discs were laminated with a third disc of tape by pressing at 5000 psig. (7.2 Kg./cm.$^2$) for a minute at room temperature, to provide two buried electrodes. Five such samples were prepared for each example.

The laminated, unfired samples were placed in an unheated box furnace (air atmosphere). The temperature was raised to 500° C. over 16 hours, then to the peak temperature (900° C., 950° C., or 1000° C., as indicated below), over 1 hour. The temperature was held at peak for 1 hour, then slowly cooled to room temperature over 2–3 hours.

Capacitance and dissipation factor (DF) were determined as follows. The fired multilayer capacitors were mounted in the jaws of an automatic RLC Bridge (General Radio Model No. 1683) where both capacitance and DF were automatically read. Knowing the capacitance, dimensions of electrode and thickness of the fired central dielectric layer, effective dielectric constant (K) was determined from:

$$K = \frac{\text{(Capacitance in Farads) (thickness in meters)}}{\text{(area of electrode in m.}^2\text{) } (E_o)}$$

where $E_o$ is $8.82 \times 10^{-12}$ Farads/m.

EXAMPLES 1–3

In Examples 1–3, the dielectric used was A, B, and C, respectively. Peak temperature was 950° C. The electrode material was a silver composition of 60 parts silver and 40 parts of a vehicle of 70% rosin solution (10% Hercules Staybelite 470 in 90% of a mixture of kerosine, naphtha and terpineol); 15% damar varnish solution (30% varnish in 70% "Solvesco 150" aromatic solvent); 4% dibutylphthalate; 11% naphtha; and 1% soya lecithin. Results are indicated in Table II.

TABLE II

| | | | | | Dielectric Thickness | |
| --- | --- | --- | --- | --- | --- | --- |
| Example | Dielectric | Cap. (pf.) | D.F. (%) | Electrode Area (cm.$^2$) | mils | microns |
| 1 | A | 8950 | 1.3 | 0.1008 | 1.3 | 3350 |
| 2 | B | 9450 | 3.1 | 0.1008 | 1.6 | 4350 |
| 3 | C | 9650 | 4.2 | 0.1008 | 1.6 | 4440 |

EXAMPLES 4-6

In these examples dielectric B was used, with a Pd/Ag conductor composition. Peak firing temperature was varied, as indicated in Table III. The Pd/Ag ratio was 83.3% Ag/16.7% Pd, there being 60 parts metal and 40 parts of the same vehicle as Examples 1-3.

EXAMPLE 7

A strontium-containing dielectric of the following composition was prepared:

$$Pb_{0.96}Sr_{0.04}Mg_{0.27}Ti_{0.46}W_{0.27}O_3.$$

The starting materials, 9.025 g. $Sr(NO_3)_2$, 273.457 g. $PbCO_3$, 27.044 g. $MgCO_3$ (basic), 39.182 g. $TiO_2$, 66.734 g. $WO_3$, were mixed together in a ball mill with 350 cc. water for about an hour. The milled sample was then calcined in air at 600° C. for 5 hours and 875° C. for 2 hours, and then ground in a mortar and pestle to −48 mesh. Finally the sample was milled in a ball mill with 300 cc. water for 1 hour to −200 mesh.

Dielectric tapes were made as in Example 1 using 44.6 parts dielectric powder and 53.4 parts of a vehicle (22.3 parts acryloid BT, 1.6 parts Santicizer 160, 0.1 part of the rosin solution of Example 1, 0.2 parts of the glycerine solution of Example 1, and 31.2 parts

TABLE III
EXAMPLES 4-6

| Example | Firing Temp. (° C.) | Cap. (pf.) | D.F. (%) | Electrode Area (cm.²) | Dielectric Thickness mils | Dielectric Thickness microns | K |
|---|---|---|---|---|---|---|---|
| 4 | 900 | 2390 | 3.5 | 0.1008 | 1.6 | | 1100 |
| 5 | 950 | 8470 | 2.9 | 0.1008 | 1.6 | | 3900 |
| 6 | 1000 | 11163 | 0.85 | 0.1008 | 1.6 | | 5140 | trichloroethylene). The dried green tape was 2.0 mils (50 microns) thick. Capacitors were prepared as in Example 2 (silver electrodes, 950° C. peak temperature for 1 hour). Capacitance was $6.74 \times 10^{-9}$ Farads, D.F. was 3.4%, fired thickness was $4.32 \times 10^{-5}$ meters, area was $1 \times 10^{-5}$ meters, and K was 3300.

We claim:

1. A method of making a monolithic capacitor comprising a plurality of superimposed alternating layers of a dielectric composition and metal electrodes bonded together into a unitary body, the method comprising the steps of a. calcining in air, at a peak temperature in the range 750°-900° C., for at least 5 minutes, a mixture of oxides or precursors thereof in such relative proportions to produce a dielectric composition, having the formula $$(Sr_xPb_{1-x}TiO_3)_a(PbMg_{0.5}W_{0.5}O_3)_b$$

wherein
x is 0-0.10,
a is 0.35-0.5,
b is 0.5-0.65, and
a plus b equals 1,
then comminuting the resultant calcined product until substantially all the particles are 20 microns or less in largest dimension, b. preparing an unsintered flexible ceramic dielectric tape of the calcined product of step (a) in an inert liquid vehicle therefor, c. electroding two or more such tapes in the desired pattern with a dispersion of metal powder in an inert vehicle therefor, d. laminating a multiple number of such tapes as desired, the top layer being an unelectroded tape, and e. sintering the resultant laminate in air for at least 0.25 hour at a temperature in the range 900°-1050° C. to form a unitary monolithic multilayer capacitor having a K of at least 1000 and a dissipation factor of no more than 5%.

2. A method according to claim 1 wherein the metal powder of step (c) is silver powder and the sintering temperature of step (e) is in the range 900°-950° C.

3. A method according to claim 1 wherein the metal powder of step (c) is Pd/Ag and the sintering temperature of step (e) is in the range 900°-1050° C.

4. A method according to claim 1 wherein the calcining step (a) is conducted for 0.25-8 hours and the sintering of step (e) is conducted at 900°-1050° C. for 0.5-4 hours.

* * * * *